United States Patent [19]

Bromley et al.

[11] Patent Number: 5,299,686
[45] Date of Patent: Apr. 5, 1994

[54] ROLLED STRIP OF TEE-NUT FASTENERS FOR TEE-NUT FASTENER SETTING APPARATUS

[76] Inventors: Keith G. Bromley, Brownlee Dr., Bradford, Ontario; Walter H. Leistner, 97 Alamosa Dr., Toronto, Ontario, both of Canada

[21] Appl. No.: 44,494

[22] Filed: Apr. 9, 1993

Related U.S. Application Data

[63] Continuation-in-part of Ser. No. 687,167, Apr. 18, 1991, Pat. No. 5,214,843.

[51] Int. Cl.$^5$ .............. B65D 85/24; B65D 85/671; B65D 85/677; B65H 5/28
[52] U.S. Cl. .................... 206/338; 206/397; 221/71; 29/809
[58] Field of Search ............... 29/798, 809, 282, 432; 221/70, 71, 72, 74; 206/340, 338, 397, 398, 413–416, 497

[56] References Cited

U.S. PATENT DOCUMENTS

| | | | |
|---|---|---|---|
| 2,056,180 | 10/1936 | Flood . | |
| 2,079,005 | 5/1937 | Freydberg | 221/70 |
| 2,145,358 | 1/1939 | Kronquest | 206/338 |
| 2,846,061 | 8/1958 | Wilke | 206/397 |
| 3,460,217 | 8/1969 | Leistner . | |
| 3,556,743 | 1/1971 | Yeager . | |
| 3,613,878 | 10/1971 | Langas et al. | 206/340 |
| 3,704,507 | 12/1972 | Grube | 221/71 |
| 3,810,290 | 5/1974 | Grube . | |
| 3,811,171 | 5/1974 | Grube . | |
| 3,845,860 | 11/1974 | Ladouceur et al. | 206/338 |
| 4,224,731 | 9/1980 | Lingle . | |
| 4,508,220 | 4/1985 | Pearson | 206/338 |
| 4,720,010 | 1/1988 | Bertram | 206/340 |
| 4,821,940 | 4/1989 | Rotherham . | |

FOREIGN PATENT DOCUMENTS 583977 5/1989 Australia .
2436275 5/1980 France ................ 206/338

Primary Examiner—P. W. Echols
Assistant Examiner—David P. Bryant

[57] ABSTRACT

A rolled strip of Tee-nuts connected together by flexible means for use in Tee-nut setting machines, and a rotatable table support for such rolled strip of Tee-nuts. The flexible means is offset to one side of the central axis of the Tee-nuts to facilitate feeding of the Tee-nuts to the setting machine 9 Claims, 7 Drawing Sheets

ROLLED STRIP OF TEE-NUT FASTENERS FOR TEE-NUT FASTENER SETTING APPARATUS

FIELD OF THE INVENTION

The invention relates to a rolled strip of Tee-nuts, and to a package of such Tee-nuts for insertion by Tee-nut setting apparatus for setting Tee-nuts in a workpiece. This application is a Continuation-in-Part of Application Ser. No. 07/687,167 filed Apr. 18, 1991, now U.S. Pat. No. 5,214,843, entitled Fastener Setting Apparatus and Method and Strip Therefor, inventors Keith G. Bromley and Walter H. Leistner.

BACKGROUND OF THE INVENTION

Threaded Tee-nut fastening devices are widely used in the furniture industry for securing components of furniture together. Such Tee-nuts are formed of sheet metal, and incorporate on internally threaded sleeve or barrel, and an integral face flange, and spikes, which are embedded in the work piece around a pre-drilled hole. They are used, for example, in the construction of beds, for securing legs to a bed frame, and other furniture items.

Various forms of apparatus have been devised for the power-operated setting of such Tee-nuts at a high rate of speed. One example of such a Tee-nut setting apparatus is shown in U.S. Pat. No. 3,460,217.

The apparatus disclosed in that patent has operated satisfactorily for many years. In that apparatus, the wooden workpiece was first of all placed on a lower working surface. Tee-nuts were fed from a hopper down a curved, gravity slide, to a power-operated setting plunger located above the work piece. The Tee-nut was held in registration with the bottom of the plunger, and when the plunger was operated downwardly the Tee-nut was released, and the plunger struck the Tee-nut forcing it downwardly into a hole in the workpiece.

One problem in the design of such earlier machines was that they required the use of a hopper, and a relatively expensive feed mechanism, for feeding the loose Tee-nuts. These requirements added to the complexity and hence the expense of such earlier apparatus. These factors had, in turn, limited the scope of the sales of such machines. In practice, they were economical only for relatively large scale manufacturing facilities.

Another problem was that the Tee-nuts did not always slide smoothly in the slide. Occasionally the operator had to release jammed Tee-nuts.

A further proposal is shown in U.S. Pat. No. 4,821,940, granted to Allan C. Rotherham entitled Tee-nut Insertion Machine.

In this machine, a hopper and feed mechanism generally similar to that shown in earlier Tee-nut insertion machines, was used. However, in this machine, the Tee-nuts were fed to a feed mechanism from which they were delivered one at a time to a plunger. The plunger in this case operated with an upward insertion stroke, so that the Tee-nut was forced upwardly into the workpiece. Above the workpiece, a stationary anvil or support was located against which the workpiece was held, while the Tee-nut was forced upwardly. In this device, however, the Tee-nuts were simply placed loose in the hopper as in the earlier devices, and as a result, it was necessary to provide for a two position delivery system for delivering the Tee-nuts to the plunger.

The Tee-nuts were delivered to a preliminary insertion location, at which point they stopped. The end most Tee-nut was then moved over a ledge, one at a time by a piston, from the preliminary location, to the so called extended location, in which position it was then held ready for insertion by the plunger.

BRIEF SUMMARY OF THE INVENTION

With a view to overcoming the various disadvantages noted above the invention comprises, a rolled strip of a plurality of separate Tee-nuts, said rolled strip of Tee-nuts comprising, sleeve portions defining an interior, and an exterior adapted to be embedded in a workpiece, interior threads formed on the interior of said sleeve portions, face flanges adapted to lie on the surface of a workpiece and formed integrally with said sleeve portions, said sleeve portions defining a longitudinal axis, and said face flanges lying in a plane transverse to said longitudinal axis and defining first and second faces on opposite sides, said first faces surrounding said sleeve portions and said second faces being opposed thereto, continuous breakable means secured to said second faces of said flanges of said separate Tee-nuts and joining respective said Tee-nuts, forming the same into a strip, and defining spacing between adjacent Tee-nuts whereby said continuous breakable means is adapted to flex between adjacent said Tee-nuts, said strip of Tee-nuts being rolled into a roll of Tee-nuts, and, said breakable means being offset to one side of said Tee-nuts.

The invention further comprises such a rolled strip of Tee-nuts and wherein said continuous breakable means joining said Tee-nuts comprises a continuous length of a breakable web secured to said second faces of said face flanges of said Tee-nuts.

The invention further comprises such a rolled strip of Tee-nuts and wherein said continuous breakable means joining said Tee-nuts comprises continuous wire means secured to said Tee-nuts, said wire means being breakable between said Tee-nuts.

The invention further comprises such a rolled strip of Tee-nuts and including a back panel on one side of said roll, and means passing around said roll to secure same on said back panel.

The invention further comprises such a rolled strip of Tee-nuts and wherein said face flanges of said Tee-nuts are spaced apart from one another by a distance D, and wherein said face flanges have a thickness of T, and wherein said distance D is from between about 0.2 T and 0.4 T.

The invention further comprises such a rolled strip of Tee-nuts and including drum means of generally cylindrical shape, and said strip being rolled around said drum means.

The invention further comprises in combination, a rolled strip of Tee-nuts, as described, and a rotary table support for supporting said rolled strip of Tee-nuts and means for rotatably mounting said table support.

The invention further comprises such a combination, and including wherein said rotary table support is a horizontal surface and said rolled strip of Tee-nuts is adapted to lie on said support and including means for advancing said strip from said support along feed guide means.

The invention further comprises such a combination, and wherein said Tee-nuts in said roll are adapted to lie with edges of said face flanges lying on said rotary table support with said sleeves oriented substantially horizontally, and including guide means adapted to receive said strip of Tee-nuts from said rotary table support in an orientation rotated through about ninety degrees with said sleeve means extending perpendicularly, and said face flanges lying substantially transversely. The various features of novelty which characterize the invention are pointed out with more particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

IN THE DRAWINGS

DESCRIPTION OF A SPECIFIC EMBODIMENT

It will be appreciated that typical Tee-nut setting apparatus of one or other of the types described above, for example, is used for setting threaded Tee-nuts, in a workpiece such as the frame of a piece of furniture for example.

Figure 4:
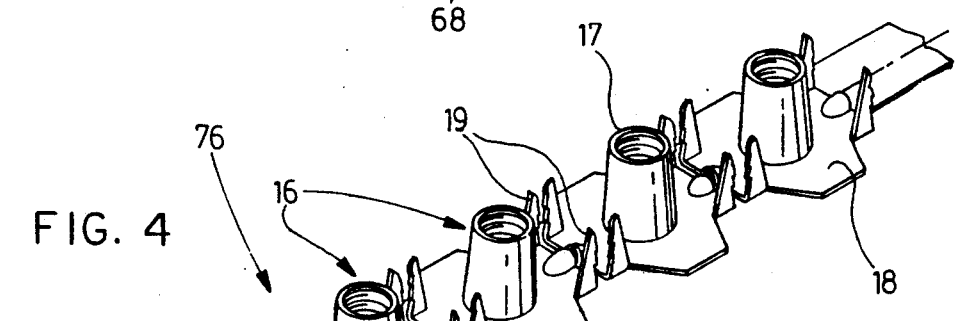
FIG. 4 is a perspective illustration of a strip of Tee-nuts, in accordance with one embodiment of the invention.
Figure 5:
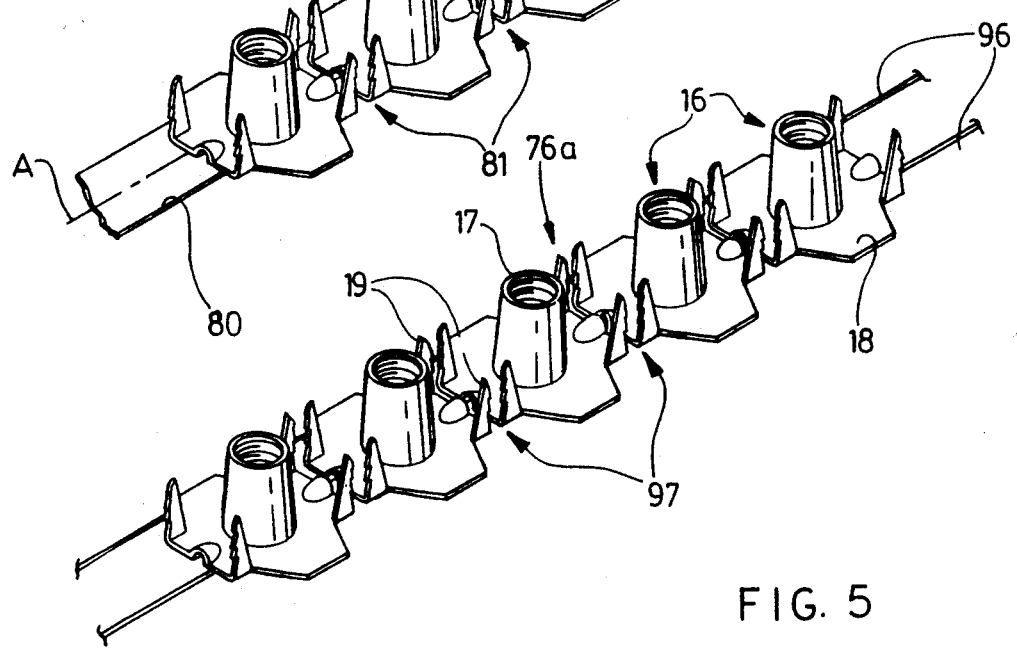
FIG. 5 is a perspective illustration of a strip of Tee-nuts, in accordance with another embodiment of the invention.

Tee-nuts are illustrated in FIGS. 4 and 5 indicated generally as 16 and each comprises an internally threaded collar or sleeve 17, and an integral face flange 18, and spikes or prongs 19.

As will be described below, the Tee-nuts 16 are associated together in the form of a elongated strip, indicated generally as S in FIG. 1, by suitable strip forming means, in a manner to be described below and are associated together in a relatively large roll R, as shown generally in FIGS. 1 and 2, described below.

The Tee-nut strip 76 illustrated in FIG. 4 consists of a series of Tee-nuts 16 adhesively bonded to a backing strip 80 of paper, plastic, or the like. This has been found to be effective and reliable in practice.

It will be noted that the web 80 has a median axis A, which is offset to one side of the central axis of the sleeves 17 of the Tee-nuts 16. This greatly facilitates the operation of the feed mechanism 82, which is then free to engage one side of each of the Tee-nuts 16, without interference from the web 80.

Alternatively, the Tee-nut strip may be formed as shown in FIG. 5 at 76a. In this embodiment, the Tee-nuts 16 are formed into a strip by being welded to two parallel wires 96–96. This form of strip, while being somewhat more costly to manufacture, may be desirable, in some circumstances, where it is required to provide a more secure form of connection between the Tee-nuts.

The two wires are offset to one side of the Tee-nuts 16, so as to leave the other side of each of the Tee-nuts free for engagement by the feed mechanism.

Figure 1:
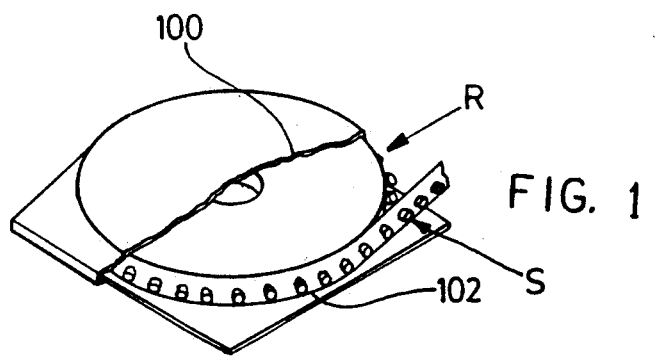
FIG. 1 is a perspective of a rolled strip of Tee-nuts.
Figure 2:
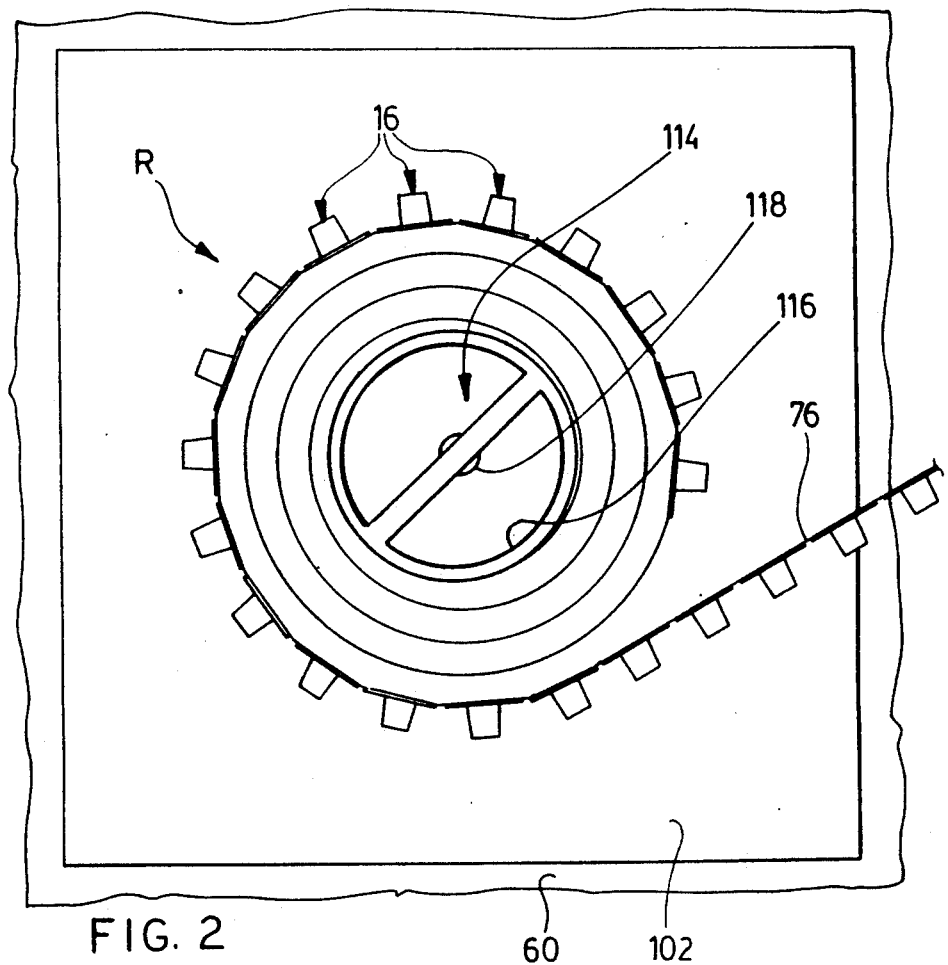
FIG. 2 is a top plan view of a rolled strip of Tee-nuts, and its supporting package, shown on the rotary support table, which partially cut away.
Figure 3:
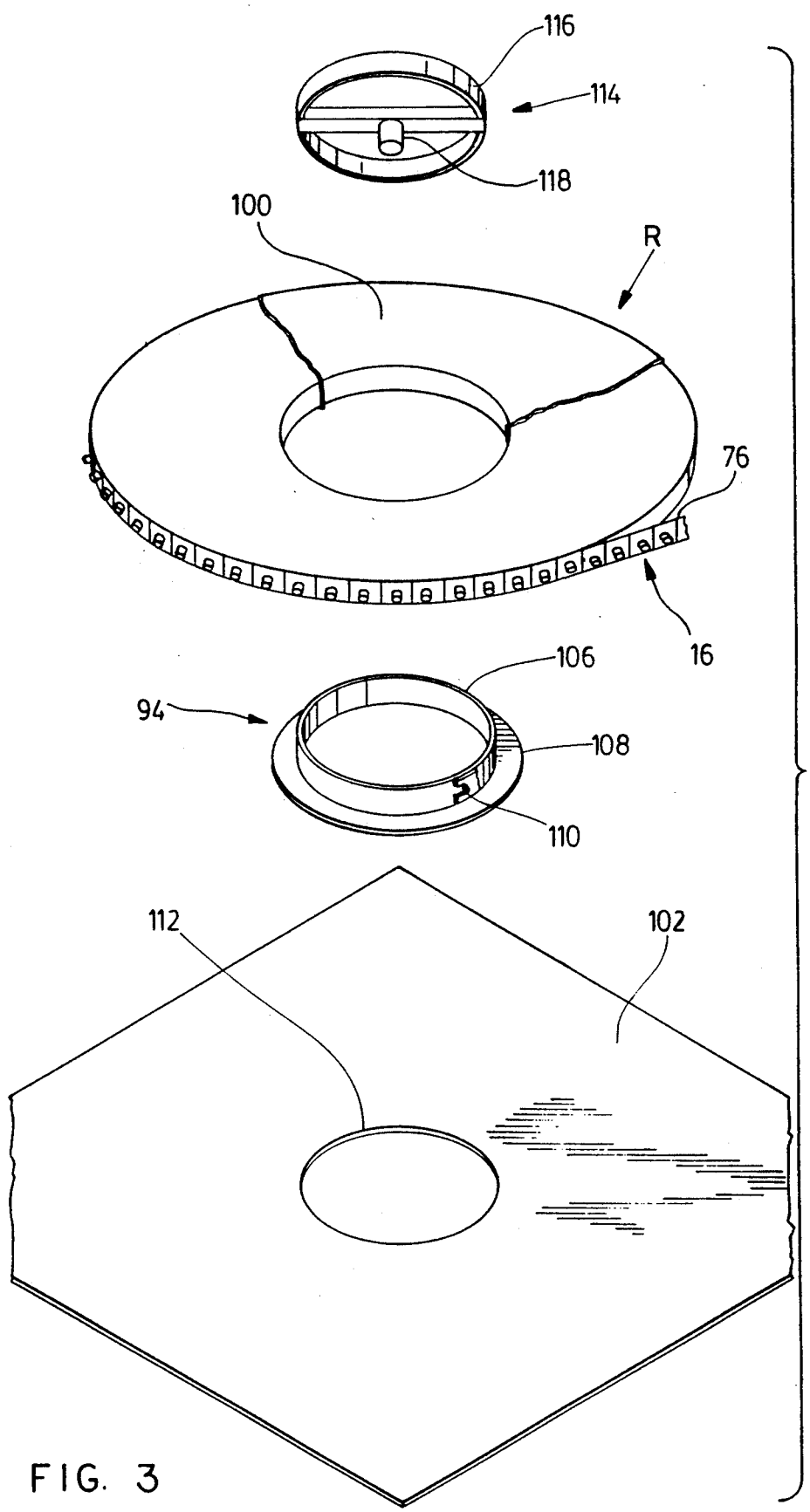
FIG. 3 is an exploded perspective illustration of a package of a rolled strip of Tee-nuts.

In either case such a strip of Tee-nuts would normally be packaged as in roll R in FIGS. 1 and 3 with fastening means 100 securing the roll for handling. A back sheet of cardboard 102 would normally be secured to one side, to facilitate handling and packing in packing cases. Typically the roll defines a central opening, and back sheet 102 would have a similar opening with fastenings or straps 100 arranged either in a radial manner as shown.

Such a rolled Tee-nut strip package is shown in more detail in FIG. 3. It will be seen in this illustration, to comprise a roll R formed of a strip of Tee-nuts indicated generally as 16. The roll R in this case may be formed around a core, comprising a central collar member 106 and an annular flange 108. An abutment or notch 110 may be formed on collar 106. The purpose of this would be to assist in locating the first of the Tee-nuts in the roll, and hold it on the collar 106, while the remaining strip of Tee-nuts is rolled thereon.

A cardboard or other base panel 102, in this case being shown of a rectangular shape, supports both the collar 104 and the roll R. A central register opening 112 is formed in back sheet 102.

The package consisting of the roll R, the collar 104 and the base 102 may be secured by shrink wrapping 100 or by strap means (not shown) or any other suitable means.

The Register Assembly

The register assembly indicated generally as 11 comprises a generally C-shaped frame, comprising an upper horizontal portion 20, a rear vertical portion 22, and a lower horizontal portion 24. The frame is secured by any suitable means such as struts 26, to the legs 15.

Secured at the forward free end of the upper horizontal frame member 20 is a downwardly extending register pin 30, preferably having a tapered or rounded leading end. The pin has a diameter equal to, or just less than the diameter of the holes H, pre-drilled in the workpiece W and has a length less than the length of such holes H. The holes H have a length which is equal to the thickness of the workpiece W, since the holes H pass entirely through the workpiece.

At the upper end of the register pin, there is provided an annular anvil or ring 32, having a diameter which is typically in the region of the width of the workpiece W, although this dimension is not critical.

Located below, and on either side of the pin 30, is a rest plate 34, adapted to support the workpiece between operations, if necessary. Rest plate 34 defines an opening 35 therein for reasons to be described below.

Preferably, the register pin 30 and anvil 32 may be adjusted vertically, to accommodate workpieces of different thicknesses. Such an adjustment may be provided by means such as a threaded fastening 36, by means of which the register pin and anvil may be secured to the upper frame member.

The Driving Assembly

The driving assembly indicated generally as 12 will be seen to comprise a rod 40, having at its upper free end a hammer head 42, and a button 43. Rod 40 is secured by means of a releasable coupling 44, to a piston rod 46. Rod 46 is, in turn, connected to a piston 48, located in power cylinder 50.

Typically, cylinder 50 will be a pneumatic cylinder, operated by air pressure supplied by hoses 52 and 54.

Air pressures in hoses 52 and 54 are controlled by means of a control valve 56, in turn, controlled, for example, by a foot pedal 57.

The operation of the piston 48 in the cylinder 50 will cause the rod 40 to drive upwardly, and to return downwardly, in a manner described below.

The feed Assembly

The feed assembly 13 is provided for feeding Tee-nuts to the driving assembly. The feed assembly comprises a generally horizontal disk-like feed table 60, rotatable mounted on vertical shaft 62. Shaft 62 is, in turn, supported, in suitable bearings 64, on the cantilever arms 2066-68. Arms 66 and 68 are, in turn, secured in this embodiment to legs 15a–15c, so that the table 60 is supported to one side of the register assembly 11 and driving assembly 12.

A feed guide 70 connects between the surface of feed table 60, and a location beneath the rest plate 34, registering with rod 40. The feed guide 70 is secured to legs 15a and 15c, but is not secured to the table 60, so that the table 60 is free to rotate, while the guide 70 remains stationary.

A roll R of a strip of Tee-nuts 16 is shown located on the table 60, and the outer free end is shown extending through the feed guide 70. The feed guide 70 is arranged in the form of a support channel which is adapted to support the Tee-nuts "on edge" in the manner in which the strip, shown as 76, will unravel from the roll R. This ensures the smooth, regular, unwinding or unravelling of the strip from the roll during operation.

Guide 70 merges at twist portion 73 into a feed slide 72, of a predetermined width, and having shoulders 74—74, enclosing a portion of a channel and defining an upwardly open narrow slot 75 having a width less than said predetermined width of said slide.

A strip 76 of Tee-nuts 16, comprising a plurality of individual Tee-nuts 16—16 secured to a backing strip 80 (FIG. 4), formed into roll R, is supported on table 60, and is fed from the table into the guide 70 and passes through twist 73 into the feed slide 72. A feed mechanism indicated generally as 82 and having a feed Paul 84 operated, for example, by a power-operated means such as a cylinder 86, operates to feed the strip 76 along the slide 72.

Figure 6:
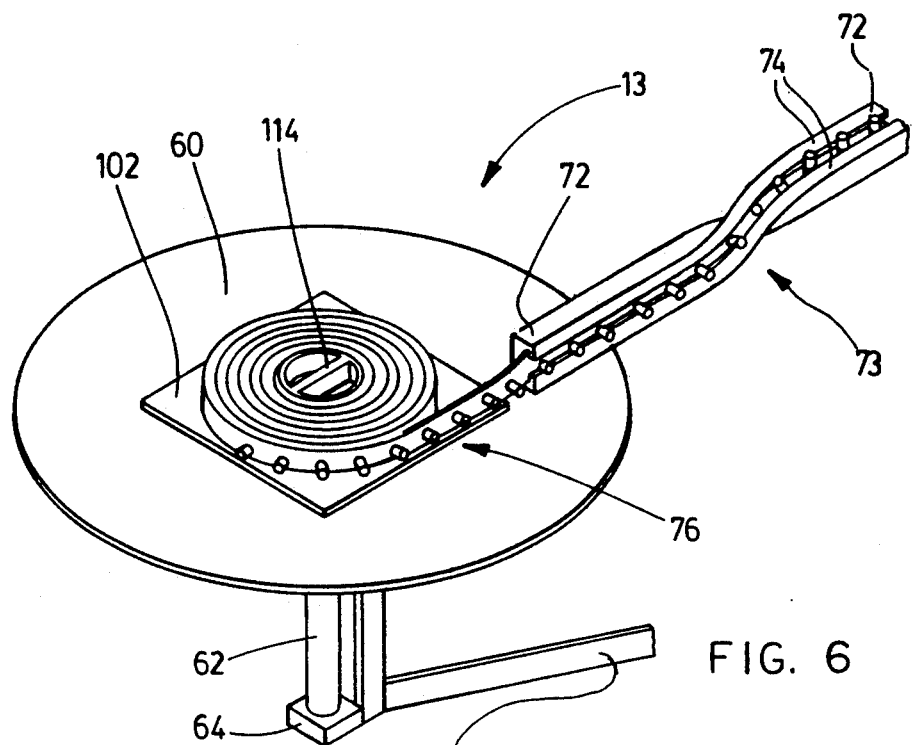
FIG. 6 is a perspective illustration of the rotary support table portion of the apparatus.

It will be noted from FIG. 6 that the roll R of Tee-nuts is positioned on the table 60, with the Tee-nuts on edge, i.e. supported on the edges of their flanges. In this way, the strip 76 of Tee-nuts can be freely unwound on edge, from the roll. However, as the strip passes through twist 73 and enters the slide 72, it twists through approximately ninety degrees, so that when the strip of Tee-nuts is in the slide 72, they are lying with their threaded sleeve portions 17 extending perpendicularly through the slot 75.

Figure 9:
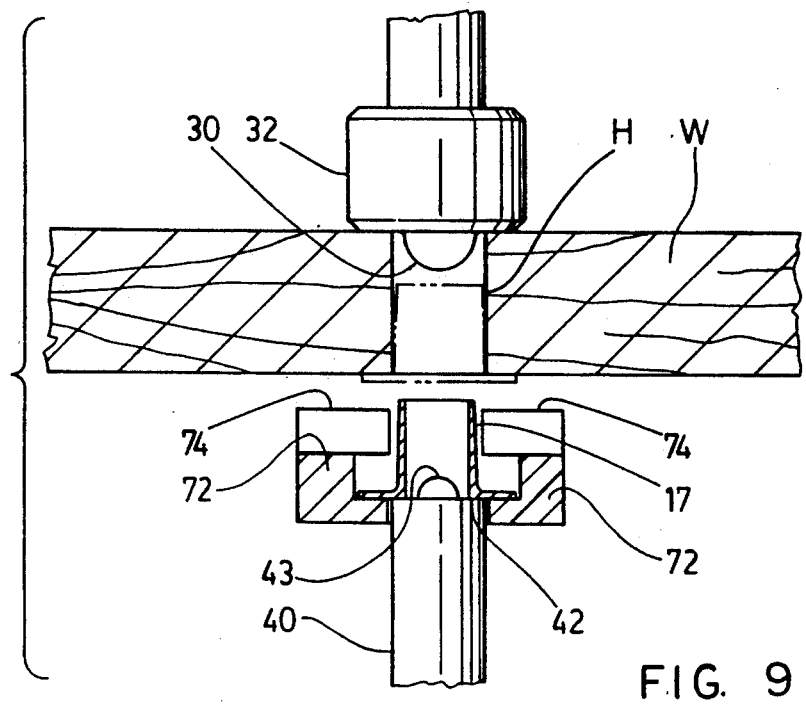
FIG. 9 is a section along line 9—9 of FIG. 10, showing the operation of the setting mechanism.
Figure 10:
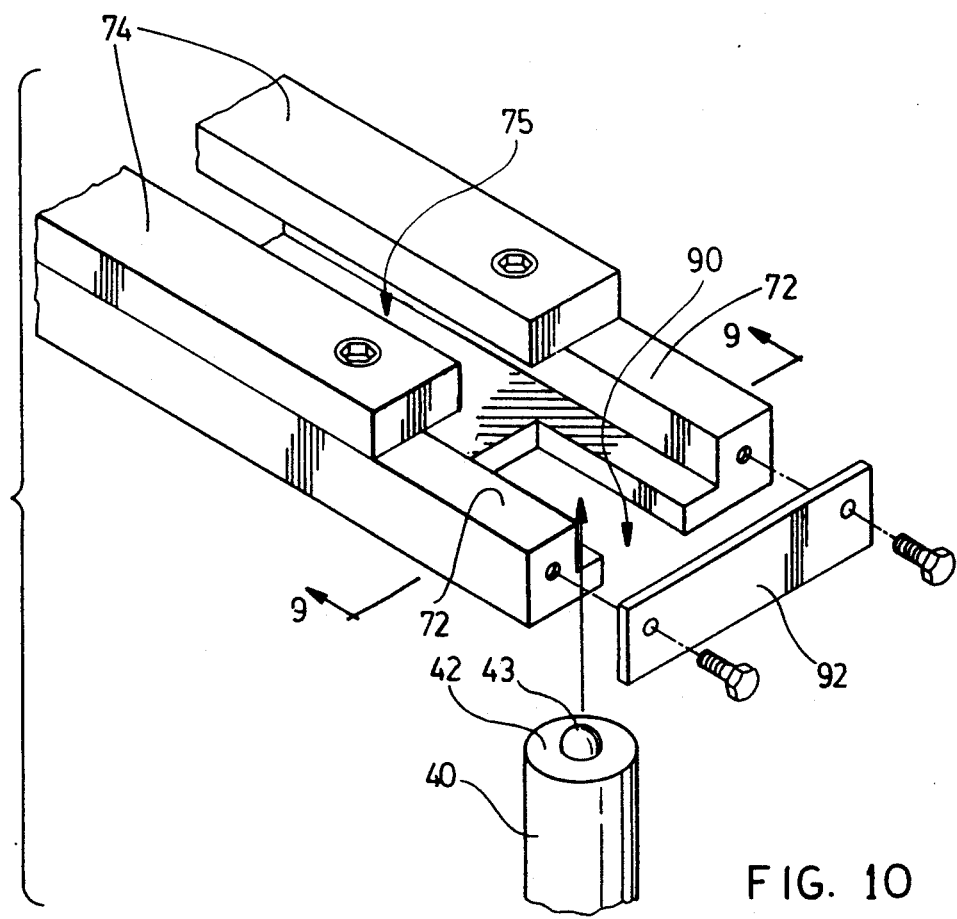
FIG. 10 is an exploded perspective of the feed channel and drive piston.

At the point where the end of the slide 72 registers with the piston 40, the slide is provided with a downwardly open recess 90, of a sufficient width to admit the rod 40. Immediately above the recess 90, the shoulders 74—74 are removed, so that the end most Tee-nut is then free of restraint from upward movement (FIG. 9 and 10).

An end plate 92 closes the open end of slide 72.

Preferably, the cylinder 86 of the feed mechanism is operate in timed relation to the operation of the piston 48. Such timed operation may be achieved by a separate valve and control, or may be achieved by connecting the valve 56 to the piston 86, so that the air exhausted from piston 48 after completion of its setting stroke, is then supplied to the cylinder 86 to provide a feed stroke. In this way, the feed mechanism will operate alternately with the setting mechanism, and provide a timed sequencing of movement of the strip along the channel.

In operation, an operator sets the roll R of Tee-nuts on the table 60 with the Tee-nuts on edge, and feeds the strip 76 of Tee-nuts through guide 70 and along the feed slide 72, and twist 73 where the strip twists through ninety degrees, until the end most Tee-nut in the strip registers with the rod 40.

The workpiece will already be pre-drilled, at the locations where the nuts are to be set, at a suitable drill apparatus located elsewhere in the plant, and requiring no description.

Figure 7:
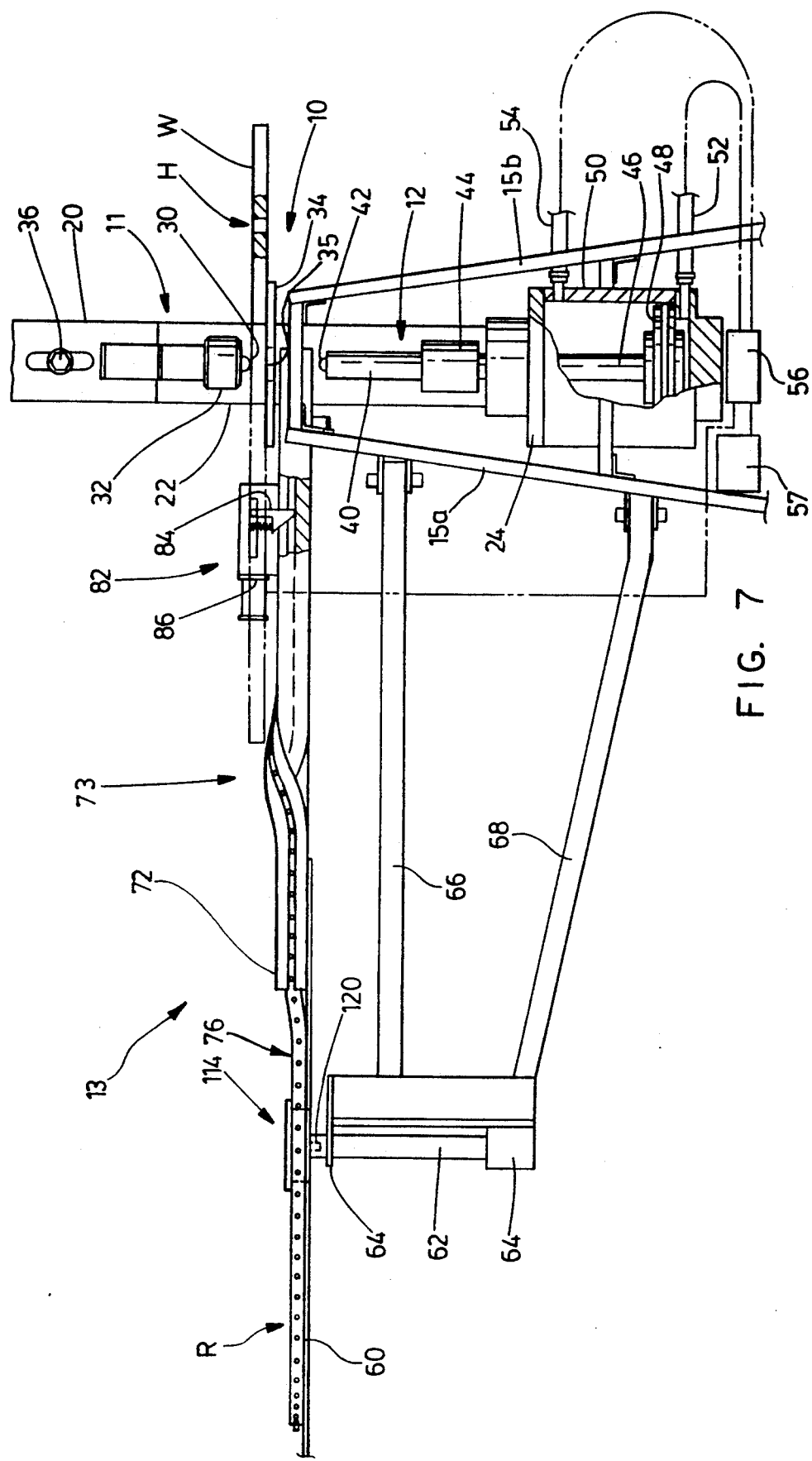
FIG. 7 is a front elevation of the apparatus according to the invention, shown partially cut away.

He will then place a workpiece W (FIGS. 7 and 9) on the table 34, and position it so that a hole H register with the register pin 30. He will then simply raise the workpiece with both hands, until the register pin 30 enters the hole. He will then operate the foot pedal 56, causing the piston 48 to be driven upwardly, and returned downwardly.

The button 42 on top of the rod 40 will then register with the sleeve portion of the end most Tee-nut 16. The end most Tee-nut 16 will then be torn away from the strip, and driven forcefully upwardly into the hole H (FIG. 9 and 10) in the workpiece W. The spikes on the flange of the Tee-nut 16 will be driven into the workpiece around the hole, and the flange will then impact on the surface of the workpiece.

The operator will then simply lower the work piece from the register pin 30 and move it until the next hole registers and repeat the operation.

On each return stroke of the piston 48, air is vented via valve 56 to cylinder 86, thereby causing the strip to advance by an increment of one Tee-nut.

It will be seen that by the use of roll R of a strip of Tee-nuts of the invention the problem of handling, sorting, and feeding loose Tee-nuts is overcome. The provision of the rotating table 60 provides a simple but effective feed mechanism, so that the Tee-nut strip can simply be rolled on edge, and unwound and fed while twisting through ninety degrees progressively to the setting apparatus.

It will thus be seen that the rolled strip R of Tee-nuts of the invention offers significant economies and significant improvements in operation both with earlier types of apparatus, both of the downward plunger and upward plunger type, as well as in the apparatus illustrated.

In use, a registering boss 114 (FIG. 3) may be provided, in the case of the Tee-nut feed apparatus as illustrated. The registering boss 114 comprises an annular ring portion 116 and a central register pin 118.

Figure 8:
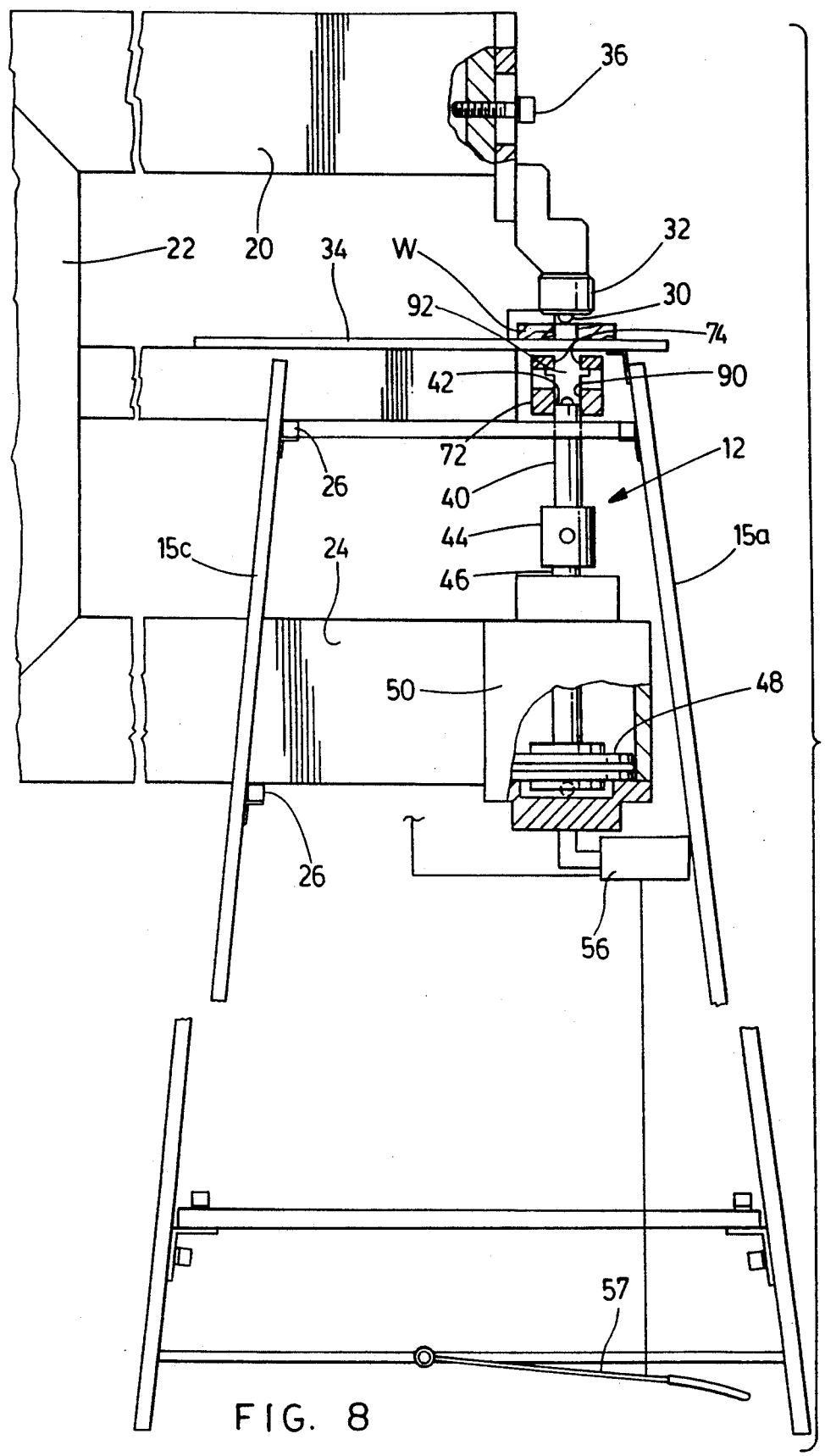
FIG. 8 is a side elevation of the operative portion of the apparatus partially cut away.

It is sized so as to fit within the interior of collar 106 of core 104. The pin 118 is intended to be received in a suitable recess 120, formed in column 62 (FIG. 8).

In this way, the entire rolled package R of Tee-nuts may simply be placed in position on edge on the table, and any strapping or the like removed.

The registering boss 114 may be then positioned, with the pin 118 in the recess 120.

The outer end of the strip 76 of Tee-nuts from the roll R may then be unwound and threaded as shown in FIG. 6, and will simply progressively unwind and twist, with the table rotating in the manner described above.

It will of course be appreciated that the Tee-nut strip itself may be formed into a roll R in several ways. The sleeve portions 17 may extend inwardly with respect to the roll or they may extend outwardly with respect to the roll (FIGS. 2 and 3).

In either case, it is considered desirable to provide a certain spacing between the individual Tee-nuts. The purpose is to ensure a clean separation between the end most Tee-nut and the next adjacent Tee-nut in the strip and to permit flexing of the strip to form a roll. Typically, the thickness of the flanges 18 will have a predetermined thickness. Preferably, the spacing between Tee-nuts will be in the region from 0.2 to 0.4 of the thickness.

Figure 11:
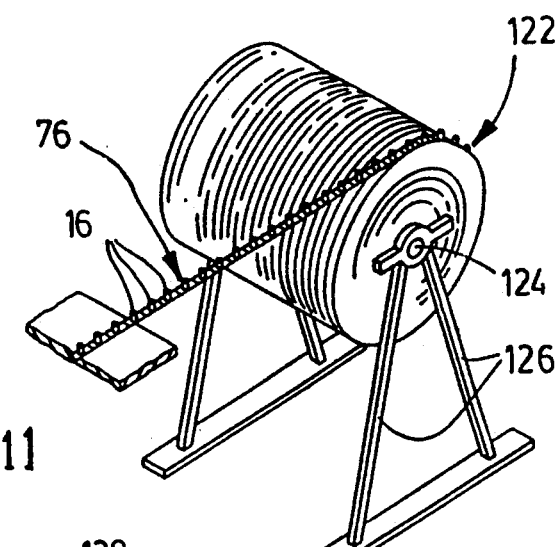
FIG. 11 is a schematic perspective of a further alternate embodiment of a rolled strip of Tee-nuts.

In accordance with a further embodiment illustrated in FIG. 11, the strip of Tee-nuts 16 may be rolled on a drum. Such a drum is indicated generally as 122. It is of cylindrical shape and may be formed of sheet metal, plastic, or paper board material. It is mounted on a generally horizontal shaft 124 supported on legs 126. Either the shaft 124 can rotate on legs 126 or drum 122 can rotate on shaft 124. In this case the strip of Tee-nuts 16 will unravel from the drum with the Tee-nuts already oriented with their sleeves 17 directed perpendicular and can be received directly in guide 72.

While the setting apparatus described herein is of the upward movement piston type it will be appreciated that the invention is equally applicable to other forms of setting apparatus such as the older downward movement piston type.

Figure 12:
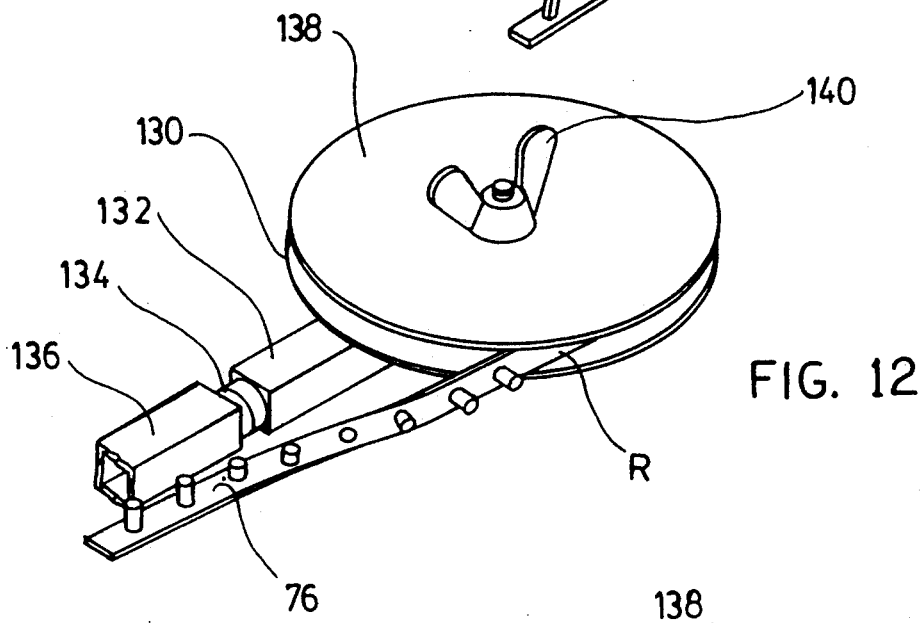
FIG. 12 illustrates a further embodiment of a Tee-nut support apparatus, in a first position, and, FIG. 13 illustrates the FIG. 12 embodiment in a second position.
Figure 13:
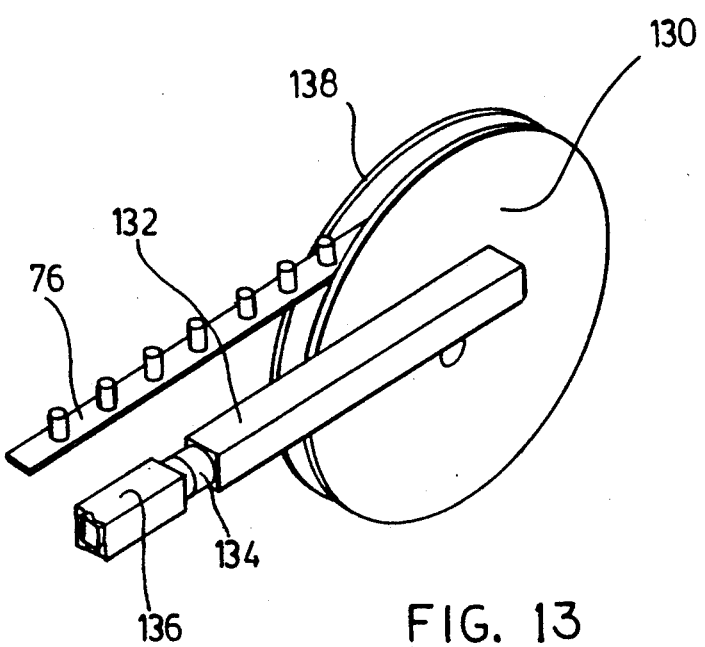

A further alternate form of feed mechanism is illustrated in FIGS. 12 and 13. In this case, a table 130 is rotatable supported on a first arm 132. Arm 132 itself is swing ably coupled, by bearing 134, to fixed arm 136. Thus table 130 can be swung from a horizontal, to a vertical position. A cover plate 138, and bolt or nut 140 are provided to hold a roll R of Tee-nuts on table 130. It will be seen that once a roll R of Tee-nuts has be secured on table 130, by plate 138, the table can be swung through ninety degrees. Thus the strip of Tee-nuts will unravel directly into slide 72.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A rolled strip of a plurality of separate Tee-nuts, said rolled strip of Tee-nuts comprising;

Tee-nut sleeve portions defining an interior with threads therein, and an exterior adapted to be embedded in a workpiece and said sleeve portions each defining a central sleeve axis;

Tee-nut face flanges adapted to lie on the surface of a workpiece and formed integrally with said sleeve portions, said sleeve portions defining a longitudinal axis, and said face flanges lying in a plane transverse to said longitudinal axis and defining first and second faces on opposite sides, said first faces surrounding said sleeve portions and said second faces being opposed thereto;

continuous breakable means secured to the exterior of said second faces of said separate Tee-nuts and joining respective said Tee-nuts, forming said Tee-nuts into a strip, and defining spacing between adjacent Tee-nuts whereby said continuous breakable means is adapted to flex between adjacent said Tee-nuts and said breakable means defining a median axis;

said strip of Tee-nuts being rolled into a roll of Tee-nuts, and, said median axis of said breakable means being offset to one side of the central axis of each sleeve portion of each Tee-nut.

2. A rolled strip of Tee-nuts as claimed in claim 1, wherein said continuous breakable means joining said Tee-nuts comprises a length of a breakable web secured to said second faces of said face flanges of said Tee-nuts.

3. A rolled strip of Tee-nuts as claimed in claim 1, wherein said continuous breakable means joining said Tee-nuts comprises wire means secured to said Tee-nuts, said wire means being breakable between said Tee-nuts.

4. A rolled strip of Tee-nuts as claimed in claim 1 including a back panel on one side of said roll, and fastening means passing around said roll to secure said roll on said back panel.

5. A rolled strip of Tee-nuts as claimed in claim 1, and wherein said face flanges of said Tee-nuts are spaced apart from one another by a predetermined spacing, and wherein said face flanges have a predetermined thickness, and wherein said spacing is from between about 0.2 and 0.4 of said thickness.

6. A rolled strip of Tee-nuts as claimed in claim 1 and including drum means of generally cylindrical shape, and said strip being rolled around said drum means.

7. In combination, a rolled strip of Tee-nuts, as claimed in claim 1 including rotary table support for supporting said rolled strip of Tee-nuts and means for rotatably mounting said table support.

8. In combination, a rolled strip of Tee-nuts as claimed in claim 7 wherein said rotary table support is a horizontal surface and said rolled strip of Tee-nuts is adapted to lie on said support and including means for advancing said strip from said support along feed guide means.

9. In combination, a rolled strip of Tee-nuts as claimed in claim 7, and wherein said Tee-nuts in said roll are adapted to lie with edges of said face flanges lying on said rotary table support with said sleeves oriented substantially horizontally, and including guide means adapted to receive said strip of Tee-nuts from said rotary table support in an orientation rotated through about ninety degrees with said sleeve means extending vertically, and said face flanges lying substantially horizontal.

* * * * *